(12) United States Patent
Kulick et al.

(10) Patent No.: US 9,165,079 B1
(45) Date of Patent: Oct. 20, 2015

(54) ACCESS CONTROLS IN A SEARCH INDEX

(75) Inventors: Matthew E. Kulick, San Francisco, CA (US); Daniel Hottinger, Mountain View, CA (US); Yaacov Ben-Israel, Gibton (IL); Daniel Belov, San Francisco, CA (US)

(73) Assignee: Google Inc., Mountain View, CA (US)

( * ) Notice: Subject to any disclaimer, the term of this patent is extended or adjusted under 35 U.S.C. 154(b) by 445 days.

(21) Appl. No.: 13/604,870

(22) Filed: Sep. 6, 2012

Related U.S. Application Data

(60) Provisional application No. 61/531,532, filed on Sep. 6, 2011.

(51) Int. Cl.
*G06F 7/00* (2006.01)
*G06F 17/30* (2006.01)

(52) U.S. Cl.
CPC ...... *G06F 17/3087* (2013.01); *G06F 17/30091* (2013.01); *G06F 17/30699* (2013.01)

(58) Field of Classification Search
None
See application file for complete search history.

(56) References Cited

U.S. PATENT DOCUMENTS

| | | | |
|---|---|---|---|
| 7,877,781 B2 | 1/2011 | Lim | |
| 7,984,066 B1* | 7/2011 | Kilday et al. | 707/781 |
| 2003/0072289 A1* | 4/2003 | Yuang et al. | 370/338 |
| 2005/0246338 A1* | 11/2005 | Bird | 707/9 |
| 2006/0206462 A1 | 9/2006 | Barber | |
| 2006/0235985 A1* | 10/2006 | Ramkumar et al. | 709/229 |
| 2007/0143859 A1* | 6/2007 | Ogi et al. | 726/27 |
| 2007/0208746 A1 | 9/2007 | Koide et al. | |
| 2007/0250486 A1 | 10/2007 | Liao et al. | |
| 2008/0033954 A1 | 2/2008 | Brooks et al. | |
| 2008/0104695 A1* | 5/2008 | Fassino et al. | 726/17 |
| 2008/0168135 A1 | 7/2008 | Redlich et al. | |
| 2009/0106207 A1 | 4/2009 | Solheim et al. | |
| 2009/0106271 A1 | 4/2009 | Chieu et al. | |
| 2010/0185611 A1 | 7/2010 | Liao et al. | |
| 2011/0296523 A1* | 12/2011 | Schechter et al. | 726/21 |

* cited by examiner

*Primary Examiner* — Michael Hicks
(74) *Attorney, Agent, or Firm* — Fish & Richardson P.C.

(57) ABSTRACT

Techniques include: identifying a first group that has a specified number of entities or more; associating a first group restrict with the first group, where a group restrict comprises data associated with two or more members of a group; assigning the first group restrict to one or more items of content in a search index that the members of the group can access; identifying a second group associated with a second group restrict, where the second group has fewer than the specified number of entities; and assigning searcher restricts for entities in the second group to one or more items of content in the search index, where the searcher restricts include data associated with a searcher.

17 Claims, 9 Drawing Sheets

ACCESS CONTROLS IN A SEARCH INDEX

CROSS-REFERENCE TO RELATED APPLICATION

Priority is hereby claimed to U.S. Provisional Application No. 61/531,532, which was filed on Sep. 6, 2011. The contents of U.S. Provisional Application No. 61/531,532 are hereby incorporated by reference into this disclosure.

BACKGROUND

This specification relates generally to information retrieval, particularly to modifying access controls in a search index.

Search engines identify resources (e.g., images, audio, video, Web pages, text, documents) that are relevant to a user's needs and present information about the resources in a manner that is useful to the user. A search engine may be used to conduct a search of a source of data, e.g., the Internet, a social network, a local data source, non-networked content, or the like. Typically, a search engine receives a search query from a user, consults an appropriate search index to identify subject matter relevant to the search query, obtains snippets of the relevant subject matter, ranks the snippets, and output the snippets for presentation in a Web browser.

SUMMARY

An example of a technique for use with a search index includes the following operations: identifying a first group that has a specified number of entities or more; associating a first group restrict with the first group, where a group restrict includes data associated with two or more members of a group; assigning the first group restrict to one or more items of content in a search index that the members of the group can access; identifying a second group associated with a second group restrict, where the second group has fewer than the specified number of entities; and assigning searcher restricts for entities in the second group to one or more items of content in the search index, where the searcher restricts include data associated with a searcher.

In the foregoing technique, the second group restrict may be removed from the search index or from items of content in the search index to which searcher restricts for entities in the second group are assigned.

In the foregoing technique, the one or more items of content to which group restricts are assigned, and the one or more items of content to which searcher restricts are assigned includes public content. The public content may include information available from at least one unrestricted resource.

In the foregoing technique, the one or more items of content to which group restricts are assigned, and the one or more items of content to which searcher restricts are assigned, includes private content. The private content may include information available from at least one restricted resource.

An example of an operation that may be used with the foregoing technique includes updating a restrict table to reflect assignment of searcher restricts for entities in the second group. The restrict table may be accessible to determine which restricts to include in a search query.

Examples of operations that may be used with the foregoing technique also include: selecting the specified number to achieve a balance between search query complexity and search index complexity; and determining the first group based on social connection among nodes of a social graph.

Examples of operations that may be used with the foregoing technique also include: obtaining a search query, where the search query includes a group restrict and a searcher restrict; matching the group restrict to a corresponding group restrict associated with content in the search index, and matching the searcher restrict to a corresponding searcher restrict associated with content in the search index; and retrieving, from the search index, content in the search index that is associated with the corresponding group restrict, and content in the search index that is associated with the searcher restrict.

Another example of a technique for use with a search index includes the following operations: storing content in a search index in computer memory; and storing access control lists (ACL) in association with corresponding items of content, where the ACL that corresponds to each item of content includes restricts for entities that are permitted access to the item of content, where the restricts include at least one of a searcher restrict corresponding to an entity who is permitted access to the item of content and a group restrict corresponding to a group of entities that are permitted access to the item of content. The operations also include modifying an ACL for an item of content in the search index because a number of entities contained in a group identified by a group restrict in the search index is less than a specified number. The ACL may be modified to replace the group restrict for entities in the group with corresponding entity searcher restricts.

Examples of operations that may be used with the foregoing technique also include updating the search index so that the search index reflects modification of the ACL. The index may be updated within a specified period of time following modification. The index may be updated in response to the modification of the ACL.

An example of an operation that may be used with the foregoing technique includes updating a restrict table to reflect modification of the ACL. The restrict table may be accessible to determine which restricts to include in a search query.

Advantages of employing group restricts and searcher restricts as described in the examples above may include, e.g., decreasing the amount of information included the search query (e.g., the number of group restricts) or the amount of information contained the search index (e.g., the number of searcher restricts). As a result, performance degradation resulting from an amount of data associated with search queries and indices can be reduced.

The systems and techniques described herein or parts thereof may be implemented as a computer program product that includes instructions that are stored on one or more non-transitory machine-readable storage media, and that are executable on one or more processing devices. The systems and techniques described herein or parts thereof may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

In a search context, a restriction (or simply "restrict") includes data that associates a property, e.g., accessibility, to electronic content (or simply "content") in a search index. When a user submits a search query, one or more restricts can be included with the query (e.g., a textual or image query). A search engine matches restrict(s) included in the search query to restrict(s) associated with content in the search index. When a match is found, the content is deemed accessible to the searcher. The processes described herein associate (e.g., tag) content with restricts in a manner that may reduce the number of restricts that are included with a search query, or that may reduce the number of restricts that are associated with content in a search index.

The processes include storing electronic content in a search index in computer memory, and storing access control lists (ACLs) with items of the electronic content. The ACL for each item of electronic content includes restricts for entities that are permitted access to the item. The restricts include one or more of the following: a searcher restrict that corresponds to (e.g., identifies) an entity (e.g., an individual, company, or singular item) who is permitted access to the item of content, and a group restrict that corresponds to (e.g., identifies) a group of entities (e.g., individuals or other groups) that are permitted access to the item of content. In this regard, a group itself may be an entity (and, thus, a member of a group), in which case a group restrict may identify multiple groups that are permitted to access an item of content. The ACL may be modified when a number of entities contained in a group identified by a group restrict in is less than a specified number (e.g., 50 to 250). Specifically, the ACL may be modified to replace the group restrict, in that case, with corresponding individual searcher restricts.

Figure 1:
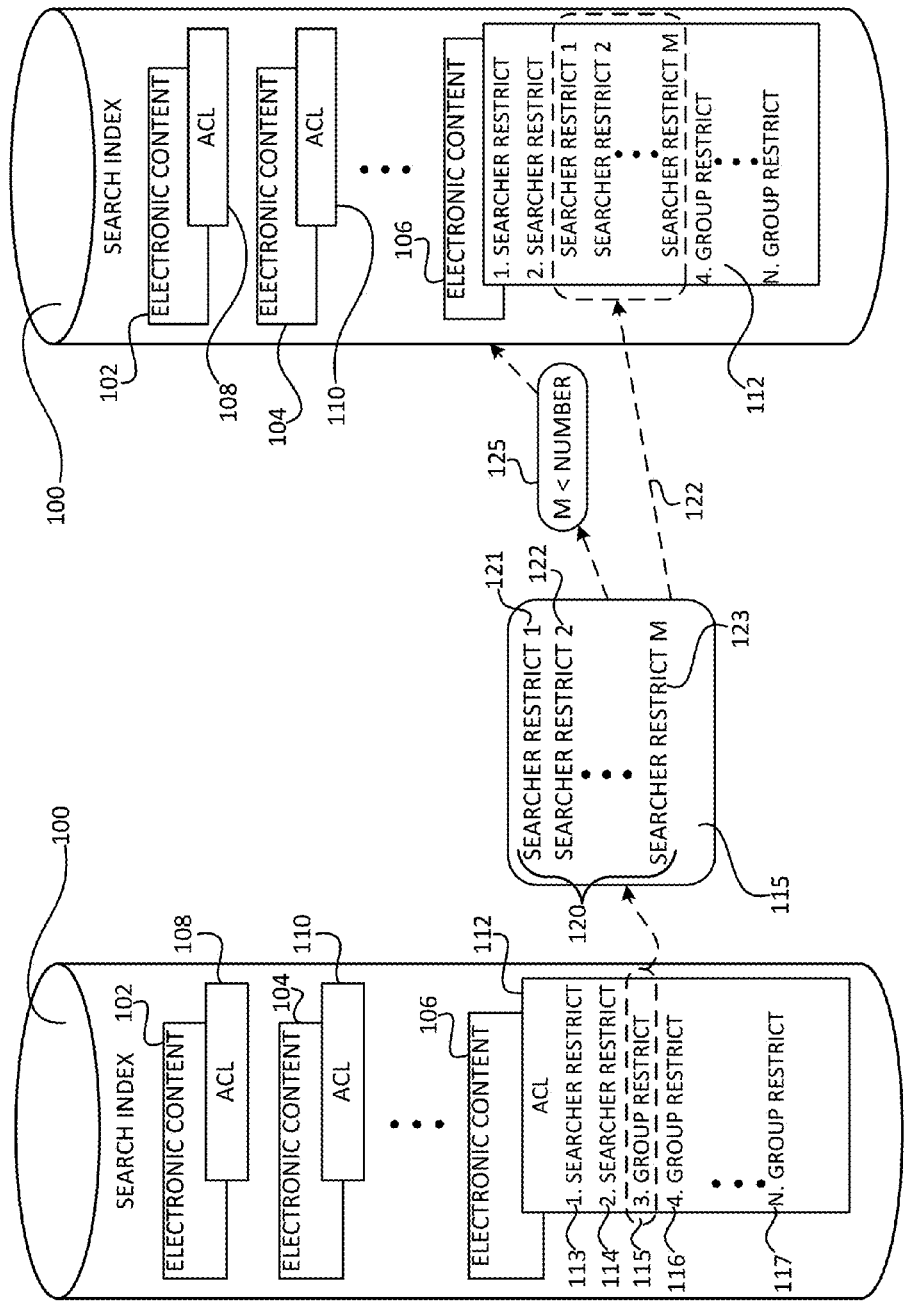
FIG. 1 is a diagram that shows, conceptually, an example process described herein for expanding group restricts in a search index.

An implementation of the foregoing process is shown conceptually in FIG. 1. More specifically, FIG. 1 is a diagram that shows, conceptually, an example process described herein for expanding group restricts in a search index 100. Search index 100 is stored in computer memory in, e.g., a server or other hardware. Search index 100 includes electronic content 102, 104, 106, e.g., indexed documents, images, video, audio. The electronic content may be from a private network and/or from a public network. The public and private content may be combined in a single search index or the two may be stored in separate search indexes. An ACL may be associated with each item of public and private content. Alternatively, ACLs may be associated with items of private content only. In the example of FIG. 1, the content items are private content. Content item 102 is associated with ACL 108; content item 104 is associated with ACL 110; content item 106 is associated with ACL 112, and so forth.

Taking ACL 112 as an example, ACL 112 includes searcher restricts 113 and 114 and group restricts 115, 116 and 117, along with others (not shown). In this example, the searcher restricts include data that is used to identify entities (e.g., a person, company, service, etc.) who are permitted to access the corresponding content item. The group restricts 115, 116 and 117 include data that is associated with groups of entities that are permitted to access the corresponding content item. In more detail, a group restrict identifies a specific group, which may include a number of entities, e.g. five, ten, 100, 1000, and so forth. Generally, entities who are associated with a group restrict may have some feature(s) in common that make it appropriate to grant them access to the same resource, e.g., content item (e.g., web page, video, audio, microblog posts, social network posts, endorsement, profile, and the like). For example, searchers who have become part of a social networking service may have access to a relatively large set of content items in the social networking service, whereas searchers who are not part of the service may not have such extensive access.

During the search process, a user inputs a search query to a search engine to conduct a search of index 100. The search query may include text, images, or other content on which a search can be based. Incorporated automatically into the search query are: (i) the searcher restrict for that user, and (ii) group restrict(s) for groups that the user is a member of, if existing. These restricts in the search query are matched to corresponding restricts in the search index 100 in order to identify documents in the search index that the user is permitted to access. These documents may be identified by the search engine, and search results thereof presented to the user.

As numbers of group restricts in a search query increase the speed of a search process may decrease. Accordingly, the number of group restricts that need to be included, per user, in the search query can be reduced by expanding group(s) in the search index. In this context, "expanding" includes listing individual searcher restricts from the group in an ACL. Expanding groups, however, can increase the size of the search index. For example, some groups may have thousands or even millions of members. Expanding such groups for each item of content in a search index increases the size of the search index. For example, ten thousand items of content may be associated with the same group restrict. That group restrict may be a relatively small amount of data. The corresponding group, however, may have a million members. If the group restricts were expanded, then those ten thousand items of content would each need to be tagged with searcher restricts for each of the million members.

In some implementations, only a subset of group restricts are expanded. Specifically, those that have less than a specified number of members (e.g., 50 to 250 entities) are expanded in the search index. So, referring to FIG. 1, group restrict 115 is for M (e.g., 30) entities 120, each having a corresponding searcher restrict 121, 122 . . . 123. Since M is less than a specified number (e.g., 50 to 250) 125, group restrict 115 is expanded in ACL 112 in the search index. For example, as shown by arrow 122 in FIG. 1, the individual searcher restricts 120 for members of a group represented by group restrict 115 are incorporated, individually, into ACL 112. In this example, group restrict 115 is also removed from ACL 112; although this need not be the case in each instance, as explained below.

By expanding group restricts in the ACL that include a number of members less than a threshold, and leaving group restricts that include a number of members greater than the threshold intact in the ACL, the amount of information included the search query (e.g., the number of group restricts) can be decreased. As a result, performance degradation resulting from an amount of data associated with search queries and indices can be reduced.

In response to modifying the search index in the manner described above, a data structure, e.g., a restrict table, may be updated to reflect the modification. Other types of data structures are possible, e.g., one or more data structures that include pointers, sets of tables, or other data. In this regard, a restrict table is associated with each individual searcher, and includes a list of groups to which the searcher belongs, among other information. Also, when a user is added to, or removed from, a group, the restrict table is updated accordingly, e.g., to add or remove the appropriate group restricts. The updating may occur automatically and as soon as the user is added to, or removed from, the group.

When a search query is submitted, restricts for groups in the restrict table are incorporated into the search query automatically, in some implementations. In cases where a group has been expanded in the search index, that group is typically removed from the corresponding user's restrict table. Thus, when that user performs a search of the index, the group restrict will not be used to identify documents to which the user is permitted access. Rather, the user's searcher restrict will be used to identify those documents. This is possible because, in this example, instances of that group have been expanded into individual searcher restricts. In other examples, instances of that group need not be expanded.

Other processes are also available for affecting the number of group restricts in a search query. For example, in an example process that is described below, searcher restricts are added to a search index for entities who are members of more than a specified number of groups (e.g., more than 10 to 30 groups).

The approaches described herein, including that described above with respect to FIG. 1, may be implemented in an appropriate network system, with appropriate devices and computing equipment. An example of such a system is described below with respect to FIGS. 2 and 3.

Figure 2:
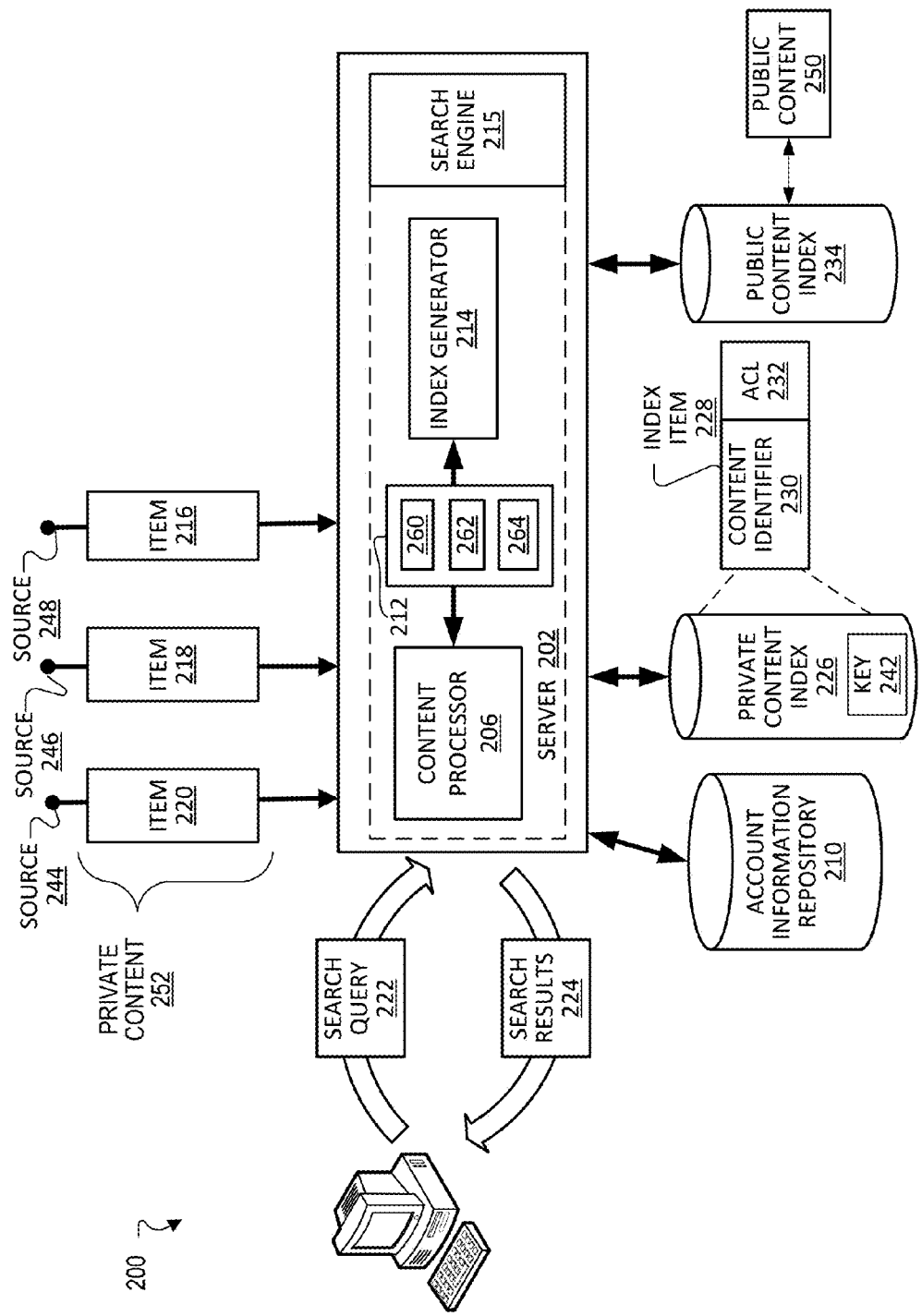
FIG. 2 is a block diagram of an example system for generating search indexes containing public content and private content.

FIG. 2 is a block diagram of an example system for generating search indexes containing public content and private content. FIG. 2 shows an example of a system 200 that can be used to search for private content 252 and public content 250. In this context, private content can include access-restricted content. Access to the private content may be limited by searcher and/or group restrict(s) associated with that content. Owners of private content may have the option to prevent having their private content indexed and accessed. Public content, generally, refers to content to which access is not restricted.

System 200 includes server 202. Server 202 includes content processor 206 which, in some examples, is a crawling engine. Content processor 206 is configured to determine private content 252 from sources 244, 246, 248, including, e.g., social networking Web sites, picture hosting Web sites, online e-mail providers, and so forth, that content processor 206 is authorized by users to access. In this regard, users can enable/disable access to their private content, e.g., users can prevent their private content from being accessed.

In the example of FIG. 2, private content 252 includes a collection of items, e.g., items 216, 218, 220. Content processor 206 may be configured to crawl sources 244, 246, 248 of private content to retrieve items 216, 218, 220. In another example, sources 244, 246, 248 may send items 216, 218, 220 to content processor 206, e.g., at pre-defined time intervals and/or when sources 244, 246, 248 obtain new items, including items that were not previously sent to content processor 206.

System 200 also includes account information repository 210. Account information repository 210 is configured to store information for accessing accounts associated with sources 244, 246, 248. In an example, a user is provided with the option of specifying which private content may be determined by the content processor and/or of specifying that only public content 250 be searched for a user.

Before storing items 216, 218, 220 of private content 252, content processor 206 may be configured to translate content in items 216, 218, 220 to a normalized format. Generally, normalization includes reformatting disparate types of content items into a standardized structure.

In this example, content processor 206 generates normalized items 260, 262 264 by normalizing the content of items 216, 218, 220. Content processor 206 groups together normalized items 260, 262, 264 into a collection, namely, normalized private content 212. In this example, normalized private content 212 is sent to other modules in server 202 as a data feed, e.g., rather than individually sending normalized items 260, 262, 264.

Server 202 also includes an index generator 214. Index generator 214 is configured to index private content 252 and to index public content 250. Index generator 214 is also configured to update these indexes with new information, including new content and new information about restrictions (e.g., restricts) on access to the indexed content.

Server 202 also includes search engine 215 for searching indexed private and public content. Search engine 215 may include, e.g., a crawling engine to crawl content, an indexing engine to index crawled content, and a ranking engine to rank content in the index (not shown). In some implementations, content processor 206 may be part of the crawling engine and index generator 214 may be part of the indexing engine of search engine 215 (as depicted graphically by the dotted line in FIG. 2). In other implementations, content processor 206 and index generator are separate from, e.g., outside of, search engine 215.

In the example of FIG. 2, index generator 214 generates private content index 226, which indexes private content 252. For example, using normalized items 260, 262, 264, index generator 214 generates corresponding index items, e.g. 228, and stores the index items in private content index 226.

Each indexed item, e.g. 228, includes a content identifier 230 and an ACL 232. Content identifier 230, includes, e.g., portions of an item of private content that index generator 214 has determined are relevant for identifying and/or for searching the item of private content, information describing the item, keywords for the item, and/or a unique identifier for the item.

An ACL, e.g. 232, is associated with each content item. The ACL includes searcher restricts identifying entities who are authorized to access the corresponding item of content (here, 228) and/or group restrict(s) identifying groups of entities who are authorized to access the corresponding item of content. In an example, index generator 214 identifies users and groups that are permitted to access corresponding content items in the search index. This information may be obtained, e.g., from the items themselves or from accounts or other information that are accessible, e.g. on a social networking service. For example, a sender of a content item is typically permitted future access to that content item. Likewise, a group of entities associated with a same account of a social networking service may be permitted access to the same information. Index generator 214 incorporates the appropriate individual and/or group restricts into ACL 232.

Items 216, 218, 220 of private content 252 may include sensitive and/or confidential information (collectively referred to herein as confidential information, without limitation, for purposes of convenience). In an example, item 216 includes such confidential information. When generating content identifier 230 of index item 228, index generator 214 includes at least a portion of the confidential information in content identifier 230. To promote secure storage of the confidential information in index item 228, index generator 214 may encrypt content identifier 230 using an encryption key, namely, key 242. Prior to including index item 228 in a search, search engine 215 may, optionally, determine that a user requesting the search is permitted access to confidential information in content identifier 230.

In still another example, content identifier 230 of index item 228 may be associated with a wrapped key (not shown). Generally, a wrapped key includes an encrypted key. To unwrap (e.g., decrypt) the wrapped key, server 202 sends the wrapped key to another security system (not shown). The security system sends the unwrapped key to server 202. The unwrapped key is used by search engine 215 to decrypt content identifier 230.

In some implementations, index generator 214 also generates public content index 234 for public content 250, including, e.g., publicly accessible Web pages, publicly accessible Web sites, publicly accessible documents, and other publicly accessible information. Index generator 214 may generate public content index 234 by crawling the World Wide Web and indexing Web pages. Items of public content may have associated ACLs indicating, e.g., that there are no restrictions on access. In cases where access to public content is restricted, appropriate restricts may be incorporated into those ACLs. Alternatively, some Items of public content need not include ACLs.

In a variation of the system shown in FIG. 2, index generator 214 may generate a single index for indexing private content 252 and public content 250, e.g., rather than generating separate indexes 226 and 234. In another variation of the system shown in FIG. 2, index generator 214 may generate individual private and public content indexes for users of system 200, e.g., rather than generating private and public content indexes 226 and 234, which may index private content 252 and public content 250. In an example, index generator 214 generates an index (not shown) indexing items of private content that are accessible to a particular user. In this example, index generator 214 also generates another, different index (not shown) indexing items of public content that are also accessible to the particular user.

In the example of FIG. 2, system 200 also includes client device 204. Using client device 204, a user (not shown), submits a search query 222 to server 202. In this example, search query 222 includes one or more search terms. Appropriate searcher and/or group restricts are incorporated automatically into the search query, and are sent to the search engine along with the search query.

Search engine 215 receives search query 222. In the example of FIG. 2, search engine 215 searches both private content index 226 and public content index 234. As described below, search engine 215 determines which items 216, 218, 220 of private content 252 the user has permission to access.

To this end, search query 222 includes a searcher restrict specifying an identity of the user submitting search query 222, along with group restrict(s) for groups for which the user is a member, if existing. Search engine 215 scans ACLs of the index items in private content index 226 to determine which of items 216, 218, 220 of private content 252 are accessible to the user submitting search query 222. In this example, items that are accessible to the user include those items having corresponding restricts (in their associated ACLs) that match the searcher restrict and the group restrict(s), if existing, in the user's search query.

Following a determination that the user has access, e.g., to item 216 of private content 252, search engine 215 determines a relevancy of item 216 to search query 222. In this example, search engine 215 determines a relevance score for item 216 using content identifier 230 and search terms included in search query 222. Generally, a relevance score includes a measure of likelihood to be responsive to a search query.

Search engine 215 may identify items 216, 218, 220 of private content 252 as relevant to search query 222. Search engine 215 generates search results for items 216, 218, 220. Generally, a search result includes information containing content from an item of information, e.g., a snippet, and a reference to a location of the item of information. A reference may include a link and/or a pointer from one item of information to another item of information.

Search engine 215 also searches public content index 234 for items of public content 250 that may be relevant to search query 222. For items of public content identified as relevant to search query 222, search engine 215 also generates search results for the items of public content 250.

Search engine 215 generates search results 224 by combining search results for items of private content 252 with search results for items of public content 250 that are relevant to search query 222. Search engine 215 ranks search results 224 in accordance with relevance of search results 224 to search query 222, and sends the ranked search results 224 to client device 204.

Figure 3:
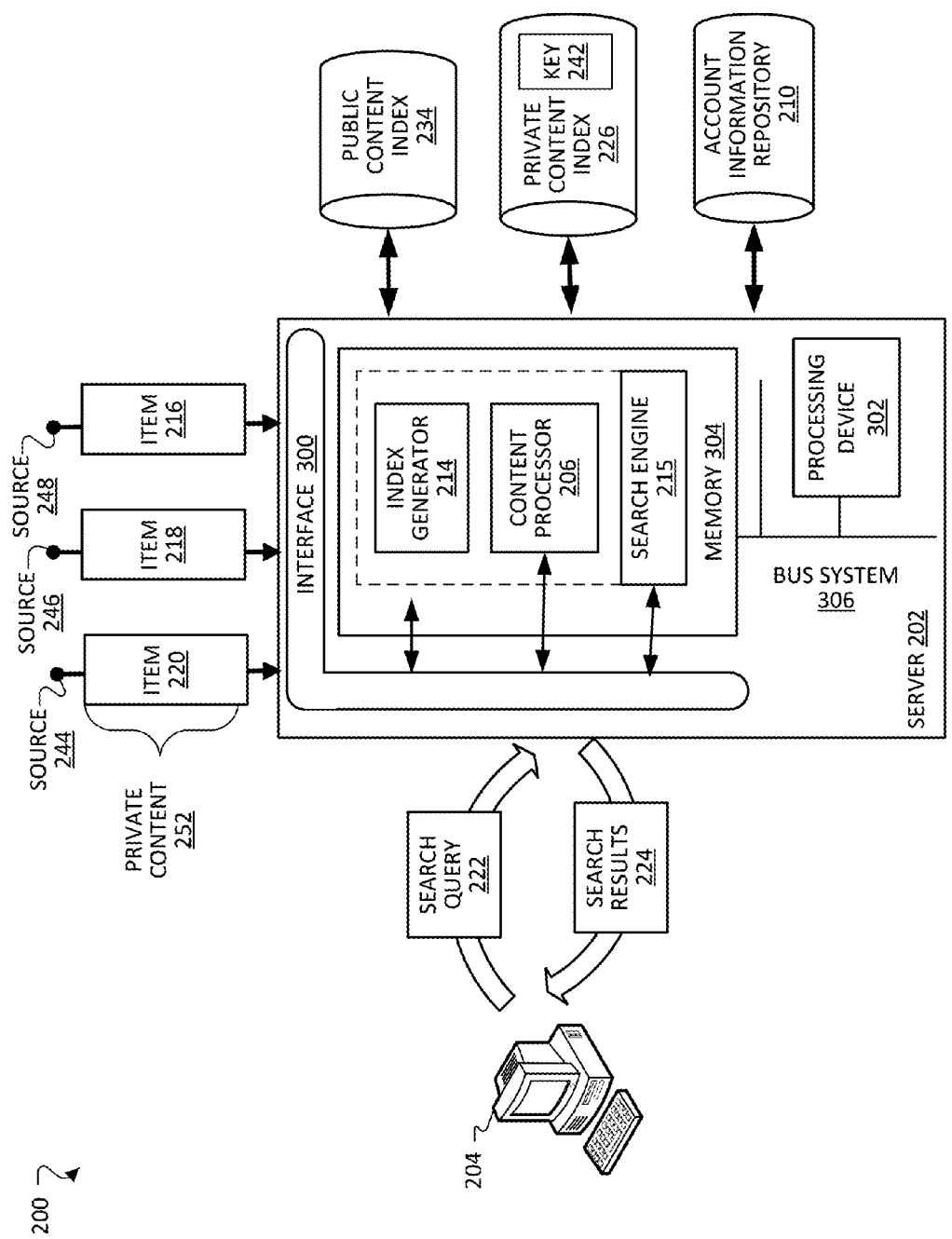
FIG. 3 is a block diagram of an example of hardware on which the system of FIG. 2 and the process of FIG. 1 may be implemented.

FIG. 3 is a block diagram of an example of hardware on which the system of FIG. 2 and the process of FIG. 1 may be implemented. More specifically, FIG. 3 shows example components of system 200 for implementing the processes described herein.

Client device 204 can be a computing device capable of taking input from a user and of communicating over a network (not shown) with server 202 and/or with other client devices. The network can include a large computer network, e.g., a local area network (LAN), wide area network (WAN), the Internet, a cellular network, or a combination thereof connecting a number of mobile computing devices, fixed computing devices, and server systems. The network(s) may provide for communications under various modes or protocols, e.g., Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a Bluetooth, WiFi, or other such transceiver.

Client device 204 can be or include a type of computing device, e.g., a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of two or more of these data processing devices or other appropriate data processing devices. In some implementations, a computing device can be included as part of a motor vehicle (e.g., an automobile, an emergency vehicle (e.g., fire truck, ambulance, a bus). Although a single client device 204 is shown in FIGS. 2 and 3, system 200 can include a plurality of client devices, which can be geographically dispersed.

Server 202 can be of a variety of computing devices capable of receiving information and running one or more services, which can be accessed by client device 204. In an example, server 202 can include a server, a distributed computing system, a desktop computer, a laptop, a cell phone, a rack-mounted server, and the like. Server 202 can be a single server or a group of servers that are at a same location or at different locations.

Client device 204 and server 202 can run programs having a client-server relationship to each other. Although distinct modules are shown in the figures, in some examples, client and server programs can run on the same device.

Server 202 can receive information from client device 204 and from sources 244, 246, 248 by input/output ("I/O") interface 300. I/O interface 300 can be a type of interface capable of receiving information over a network, e.g., an Ethernet interface, a wireless networking interface, a fiber-optic networking interface, a modem, and the like. Server 202 also includes a processing device 302 and memory 304. A bus system 306, including, for example, a data bus and a motherboard, can be used to establish and to control data communication between the components of server 202.

Processing device 302 can include one or more microprocessors, computers, or processing entities, e.g., virtual machines. Generally, processing device 302 can include an appropriate processor and/or logic that is capable of receiving and storing data, and of communicating over a network (not shown). Memory 304 can include a hard drive and random access memory storage, e.g., dynamic random access memory, or other types of non-transitory machine-readable storage devices. As shown in FIG. 3, memory 304 stores computer programs that are executable by processing device 302. These computer programs include index generator 214, search engine 215, and content processor 206, among others.

Figure 4:
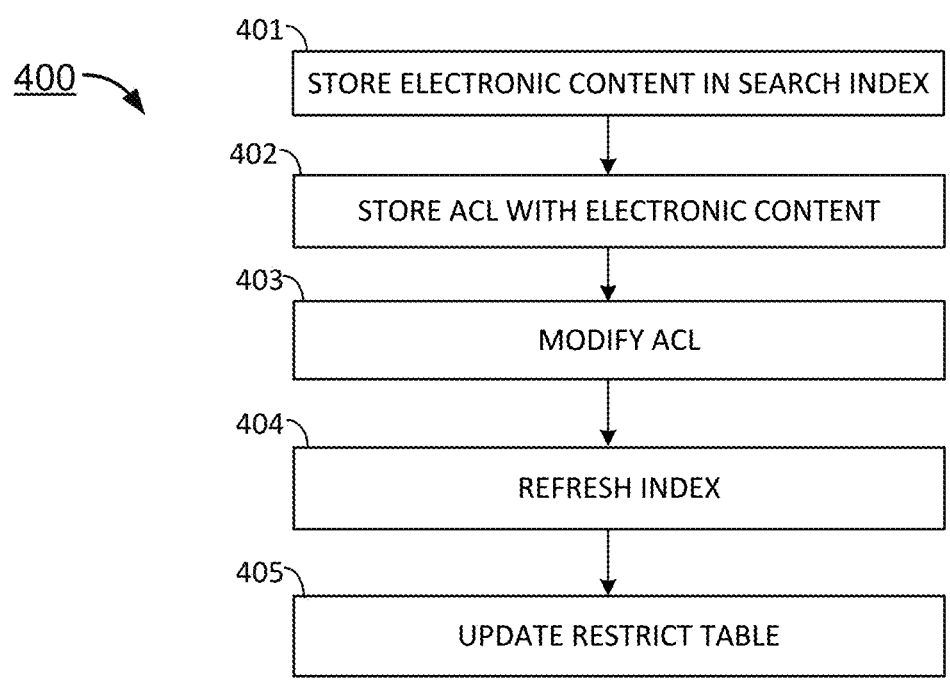
FIG. 4 is a flowchart showing an example process for modifying access control lists of a search index.

FIG. 4 is a flowchart of a process 400, which is an example of the processes described conceptually with respect to FIGS. 1 and 2, and which may be performed on the system shown in FIG. 3. Process 400 may be performed, e.g., by index generator 214.

Process 400 stores (401) electronic content in a search index. The electronic content may include index items, e.g. 228, that correspond to received private content items. The electronic content may also include items of public content 250. The public and private content items may be stored in a same search index or in different search indexes, as explained herein.

Process 400 stores (402) an ACL, e.g. 232, in association with, at least, each item of private content in the search index. As noted above, access to private content items may be restricted for some entities (e.g., entities and groups). An ACL may include searcher restrict(s), which identify entities who are authorized to access the corresponding content item; and group restrict(s), which identify groups of entities that are authorized to access the corresponding content item. Search queries that do not have restricts that match these restricts in the ACL will not typically identify the associated content item.

Process 400 modifies (403) ACLs in the search index based on one or more criteria in an attempt to achieve an appropriate relationship (e.g., balance) between search query complexity and search index complexity. For example, process 400 may modify (403) the ACLs by expanding group restricts in the ACLs. In this context, expanding the group restricts can mean adding searcher restricts corresponding to the group restricts to the ACLs. This expansion process is explained below with respect to FIG. 5. Process 400 may also modify (403) the ACLs to ensure that users will not perform searching using more than a specified number of group restricts. This process is explained below with respect to FIG. 6.

Process 400 refreshes (e.g., updates) (404) the search index following modification (403) of the ACLs. For example, process 400 makes updates to the search index that are necessitated by the expanded group restricts. Process 400 also updates (405) restrict tables for users to reflect changes to restricts in the search index. For example, process 400 may remove, from user restrict tables, group restricts that have been expanded.

Figure 5:
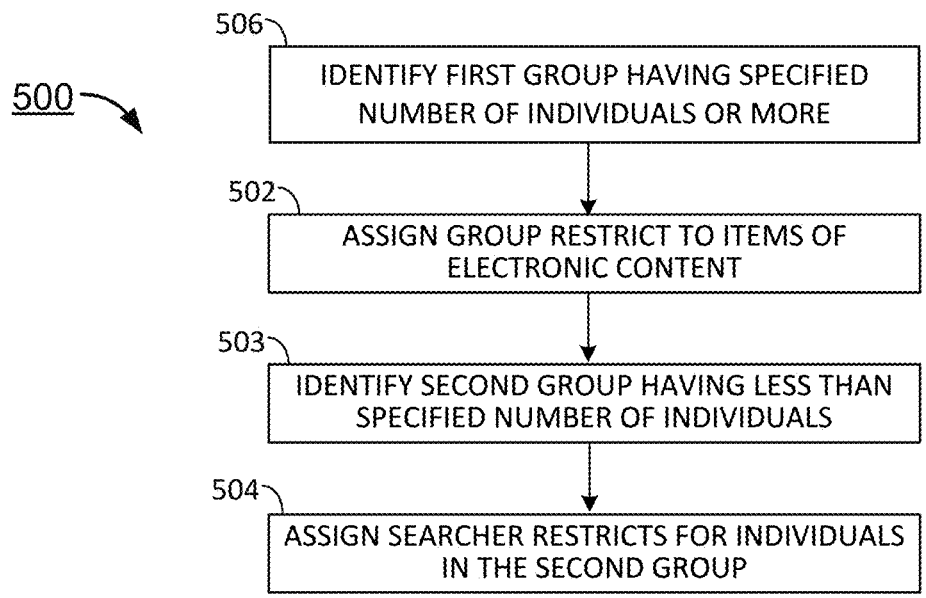
FIGS. 5 and 6 are flowcharts showing example processes for determining which restricts to modify in the search index.

FIG. 5 is a flowchart showing an example process for determining which restricts to modify in the search index. In this regard, FIG. 5 shows a process 500 showing an example of how a search index can be modified (403) or generated. Process 500 may be performed, e.g., by index generator 214.

Process 500 identifies (501) a first group that has a specified number of entities or more than the specified number. For example, process 500 may consult a database, which may be stored in the search index or elsewhere, to identify which group restricts are for groups exceeding (e.g., having greater than or equal to) the specified number of entities. In this example, that number is between 50 and 250; however, the number may be selected manually or automatically to achieve an appropriate balance between search query complexity and search index complexity. For example, the number could be on the order of 10's, 100's, 1000's and so forth.

If the search index does not already include a group restrict for the first group, item access has changed, or items have been added that members of the first group are permitted to access, process 500 assigns (502) a first group restrict for the first group to appropriate item(s) of electronic content in the search index. Members of the first group are authorized to access the electronic content so tagged with that group restrict. To this end, as explained above, members of the group will have that group restrict added to their corresponding restrict table. For example, each time search index refreshes (e.g., the search index is updated to include new information), appropriate restricts are issued to the user (e.g., the restricts are associated with the user's online profile). A separate database may contain a list of groups of which entities are members. The system identifies members of groups and issues, to those members restrict tables, appropriate group restricts.

If the search index already includes the appropriate first group restrict, and no updates or other modifications are necessary, process 500 may take no action. This is because the first group restrict is not expanded in the search index.

Process 500 identifies (503) a second group that corresponds to a second group restrict in the search index. This second group is determined to have less than the specified number of entities. To identify the second group, process 500 may consult a database, which may be stored in the search index or elsewhere, to identify which group restricts are for groups having less than the specified number of entities. Since the second group has less than the specified number of entities, process 500 expands the second group in the search index. In this context, expanding the group restrict may include replacing the second group restrict with searcher restricts for members of the second group, or it may include augmenting the search index to include searcher restricts for members of the second group while leaving the second group restrict in the search index. In cases where the group restrict is replaced, the group restrict may effectively be eliminated from the search index, or at least from items of content in the search index to which searcher restricts for entities in the second group are assigned.

Process 500 assigns (504) searcher restricts for entities in the second group to items of electronic content in the search index. In this example, the searcher restricts are added to the content item's corresponding ACL; however, other ways of assigning (also called "tagging") the searcher restricts to the content item may be used. For example, pointers or other data structures may be used to associate searcher restricts with corresponding content items.

By way of example, a user, John, is a member of a first group having 10 members. In this example, the number of entities in a group that would trigger expansion is 50 (e.g., groups with less than 50 members are expanded). Initially, John's restrict table includes, at minimum, John's searcher restrict and a first group restrict for the first group. When the first group is expanded, the 10 members' searcher restricts, including John's searcher restrict, are incorporated into appropriate ACLs in the search index. For example, at each instance where the group restrict is found, the 10 members' searcher restricts are added. Furthermore, the first group restrict is removed from Johns' restrict table. As a result, when John performs a search of the search index, John's searcher restrict is retrieved from John's restrict table and is incorporated into his search query. The first group restrict, however, is no longer in John's restrict table and is, therefore, not retrieved for incorporation into the search query. This will not affect the search results that John retrieves from the index, since John's searcher restrict is tagged to appropriate ACLs. As a result, electronic content corresponding to those ACLs will be identified as accessible to John through his searcher restrict. Thus, that content remains accessible to John without the group restrict that was expanded.

Figure 6:
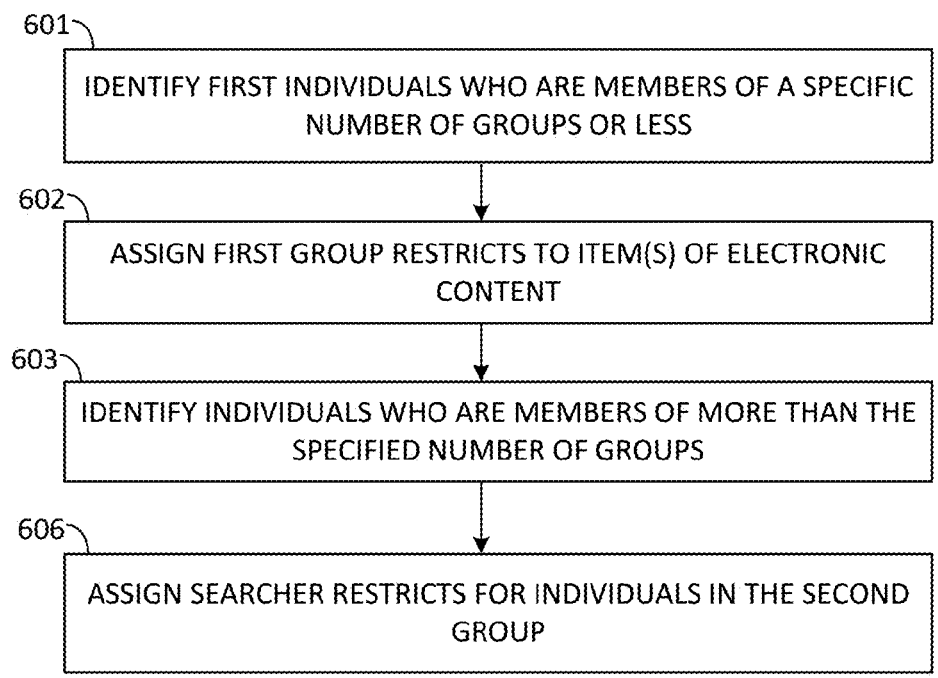

FIG. 6 is a flowchart showing an example process for determining which restricts to modify in the search index. In this regard, FIG. 6 shows a process 600 showing an example of how a search index can be modified (403) or generated. Process 600 may be performed, e.g., by index generator 214.

Process 600 identifies (601) first entities who are members a specified number of groups or less than that specified number of groups. For example, process 600 may consult a database, which may be stored in the search index or elsewhere, to identify those entities. In this example, that number is between 10 and 50; however, the number may be selected manually or automatically to achieve an appropriate balance between search query complexity and search index complexity. For example, the number could be on the order of 10's, 100's, 1000's and so forth If the search index does not already include the appropriate group restricts, item access has changed, or items have been added that the entities are permitted to access, process 600 assigns (602) first group restricts corresponding to the first entities to one or more items of electronic content in the search index. If the search index already includes the appropriate group restricts, and no updates or other modifications are necessary, process 600 may take no action at this point.

Process 600 identifies (603) second entities who are members of more than the specified number of groups (e.g., members of more than, e.g., 10 groups). In this case, process 600 assigns (604) searcher restricts corresponding to the second entities to appropriate items of electronic content in the search index. For example, process 600 adds, to the ACL for each appropriate item of electronic content, a searcher restrict for each entity who is a member of more than, e.g., 10 groups.

In this example, group restricts are not removed from the search index (since other members of the group, who are not members of more than, e.g., 10 groups, may still access the content through a group restrict). However, the second entities' restrict tables are updated to remove the corresponding group restricts. So, accessibility of content will be determined by searcher restrict, not group restrict. This process is advantageous in that it can reduce the number of group restricts that are transmitted with a search query for a category of users.

Figure 7:
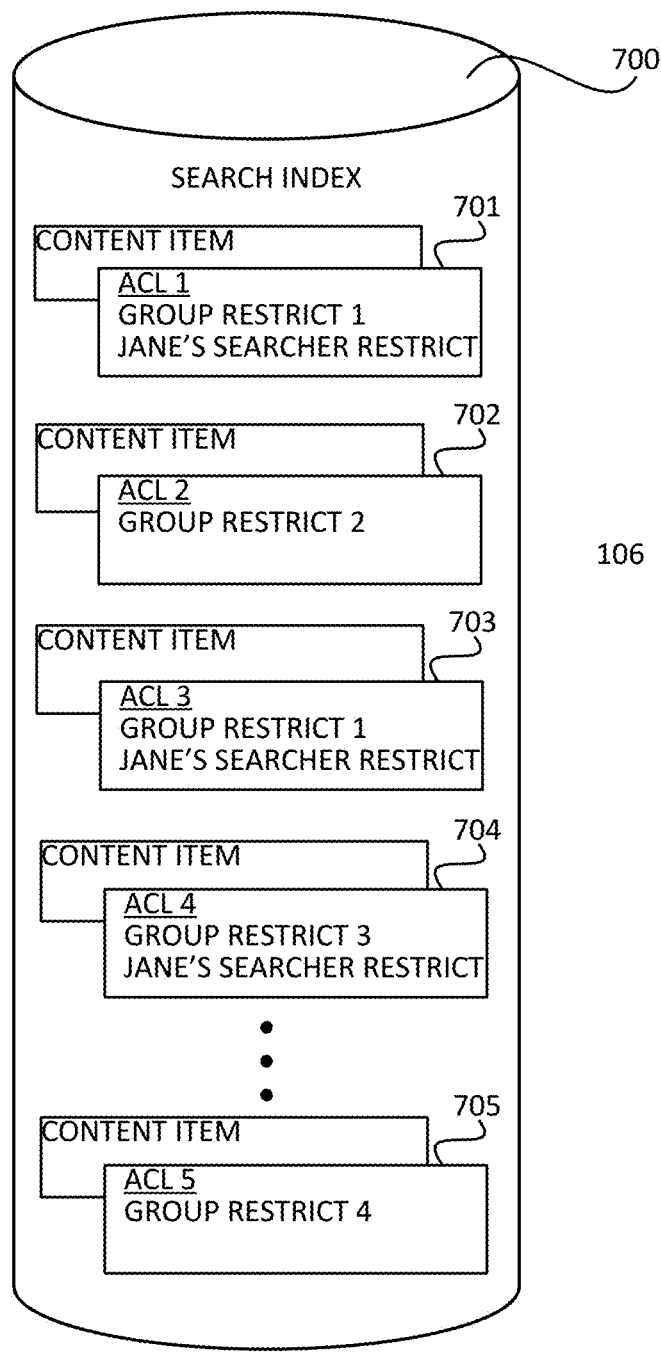
FIG. 7 shows an example of a search index modified in accordance with the process of FIG. 6.

By way of example, the maximum number of groups to which a user may belong, and not trigger operation 604, may be 10. In this example, a searcher, Jane, is a member of 200 groups. By virtue of the operations performed by process 600, ACLs containing group restricts for groups that Jane is a member of will also include, separately, Jane's searcher restrict. For example, FIG. 7 shows an example of a search index modified in accordance with the process of FIG. 6. In the example of FIG. 7, Jane is a member of groups 1 and 3. Restricts therefor are included in ACLs 701, 703 and 704, but not in ACLs 702 and 705. Process 600 therefore incorporates Jane's searcher restrict into ACLs 701, 703 and 704, thereby enabling Jane to access the corresponding content items using her searcher restrict, and not requiring Jane to include the group restricts in the search query.

Furthermore, Jane's restrict table will not be updated to include the group restricts for the 200 groups, or a portion thereof, of which Jane is a member. Accordingly, when Jane conducts a search, her searcher restrict (and not group restricts) will be used by the search engine to identify which content that Jane is permitted to access. Accordingly, in this example, process 600 reduces the number of group restricts that must be included in a search query.

In some implementations, if a user exceeds the specified number of groups, process 600 may only be performed to the extent that the number of groups exceeds the specified number. In the above example, where Jane has 200 groups and the specified number is 10, process 600 may only incorporate Jane's searcher restrict into ACLs that include group restricts for 190 of the groups, and not in the remaining ACLs, leaving her with group-based access to the remaining 10 groups. In this case, Jane's restrict table is modified accordingly.

In other implementations, access to documents need not be limited by constructs, e.g., the restricts described herein. Rather, documents that match a query may be retrieved from a search index, and those documents may be filtered using one or more criteria that identify which documents that a user is permitted to access. A system similar to this may be used, for example, for smaller search indexes and/or in systems having sufficient parallel processing capabilities.

Instead of restricts, a table or other data structure that represents documents having a certain property may be used to specify which entities have access to which electronic documents. In some implementations, such data may include bits in an encryption key used to access the document.

In the context of the processes described herein, electronic content of a social network that can be accessed by its members can be tagged with appropriate restricts. For example, blog posts, messages (e-mail, text, tweets, posts), comments, images, video, audio, and more can be tagged.

In some implementations, a group, to which a group restrict is assigned, may be based on an entity's social graph information. For example, a group may be defined based on a proximity to a node (e.g., an individual) in a social graph. For example, entities having a direct connection to an entity may be grouped, entities within two nodes of an entity (e.g., an indirect relationship—a contact of a contact, for example) may be grouped and so on. Group restricts may be suggested on this basis.

Figure 8:
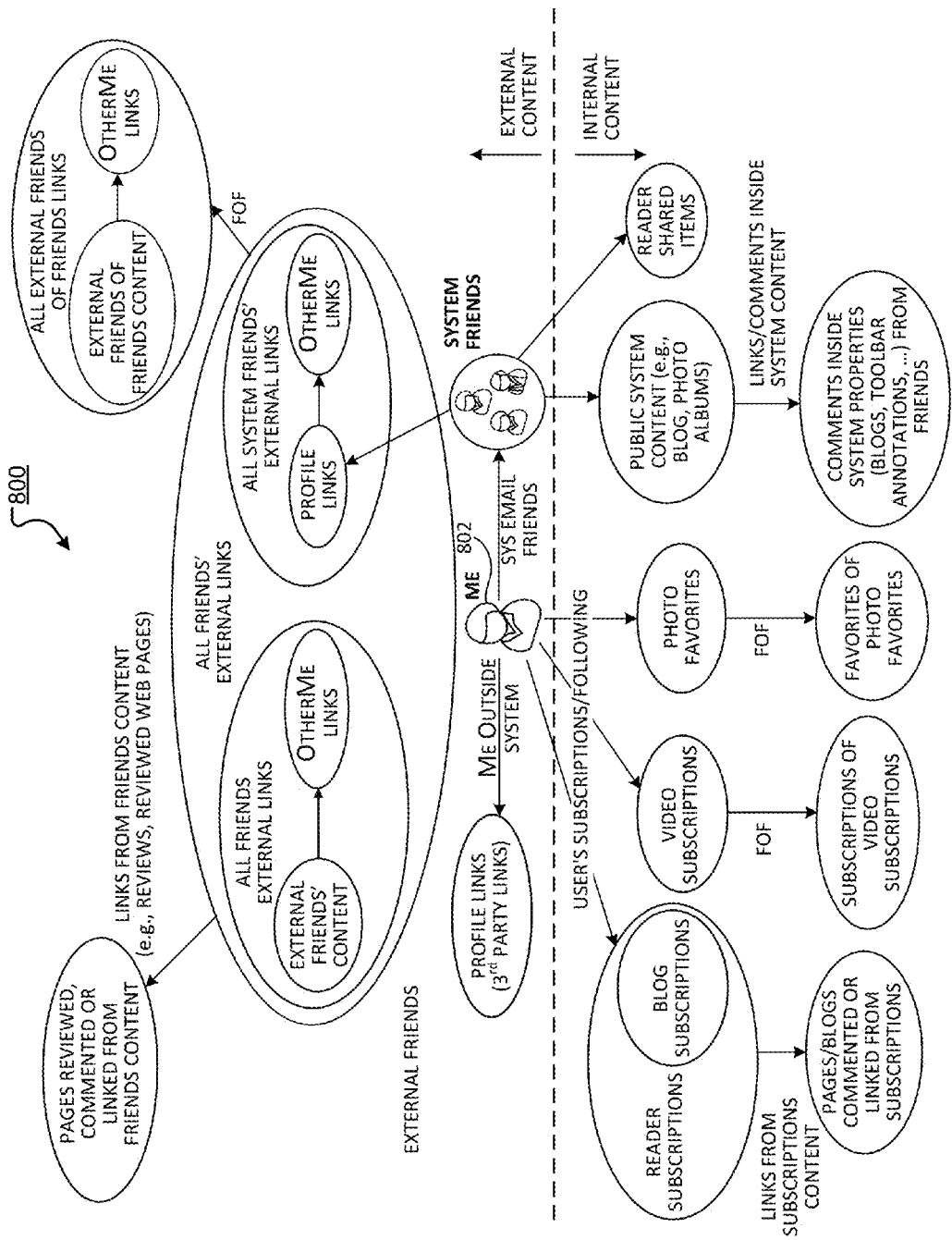
FIG. 8 is a conceptual view of an example of a social graph.

FIG. 8 is a conceptual view of an example of a social graph. In this regard, FIG. 8 shows sources of information for a social graph. In this example, a user's social graph is a collection of connections (e.g., users, resources, etc.) identified as having a relationship to the user 802 within some degree of separation. The user's social graph can include people and particular content at different degrees of separation. For example, the social graph of a user can include contacts, contacts of contacts (e.g., as defined by a user, social graphing site, or other metric), the user's social circle, people followed by the user (e.g., subscribed blogs, feeds, or Web sites), co-workers, and other specifically identified content of interest to the user (e.g., particular Web sites). Contact on a social graph may be direct or indirect. In some examples, a direct connection may be unilateral or bilateral. Members of a social graph are not limited to people, but rather may include, e.g., companies, services, or other entities to which a connection can be made.

Diagram 800 shows a user 802 and the different connections that are possible to extend the user's social graph to people and content both within a system and across one or more external networks. For example, the user can have a profile or contacts list that includes a set of identified contacts, a set of links to external resources (e.g., Web pages), and subscriptions to content of a system (e.g., a system that provides various content and applications including e-mail, chat, video, photo albums, feeds, or blogs). Likewise, blogs that include links to a user's contacts may be part of the user's social graph. Each of these groups can be connected to other users or resources at another degree of separation from the user. For example, contacts of the user each may have their own profile that includes links to resources as well as contacts of the respective contacts. In another example, a user may be connected to a social networking account. That social networking account may reference an article in a newspaper. A social connection, therefore, may be established between the user and the author of the article.

The connections to a user within a specified number of degrees of separation can be considered the social graph of the user. Membership and degree of separation in the social graph may be based on other factors, including a frequency of interaction. For example, a frequency of interaction by the user may be, e.g., how often the user visits a particular social networking site) or a type of interaction may be, e.g., endorsing, selecting, or not selecting items associated with contacts. As interaction changes, the relationship of a particular contact in the social graph can also dynamically change. Thus, the social graph can be dynamic rather than static.

Members of a social networking service or others can designate particular resources as endorsed, claim resources, share resources, quote URLs, or otherwise indicate an interest or liking of content, e.g., a particular resource, Web page, or search result. For example, an application, widget, or scripting can be provided in search results pages, Web pages, or within a browser application that allows a user to indicate liking, sharing, or other evaluation of an associated resource or search result. The user can mark the particular resource, Web site, or search results to indicate endorsement or other evaluation (e.g., though a browser control or user interface element presented with the associated content). These types of information may also be reflected in members' social graphs.

Figure 9:
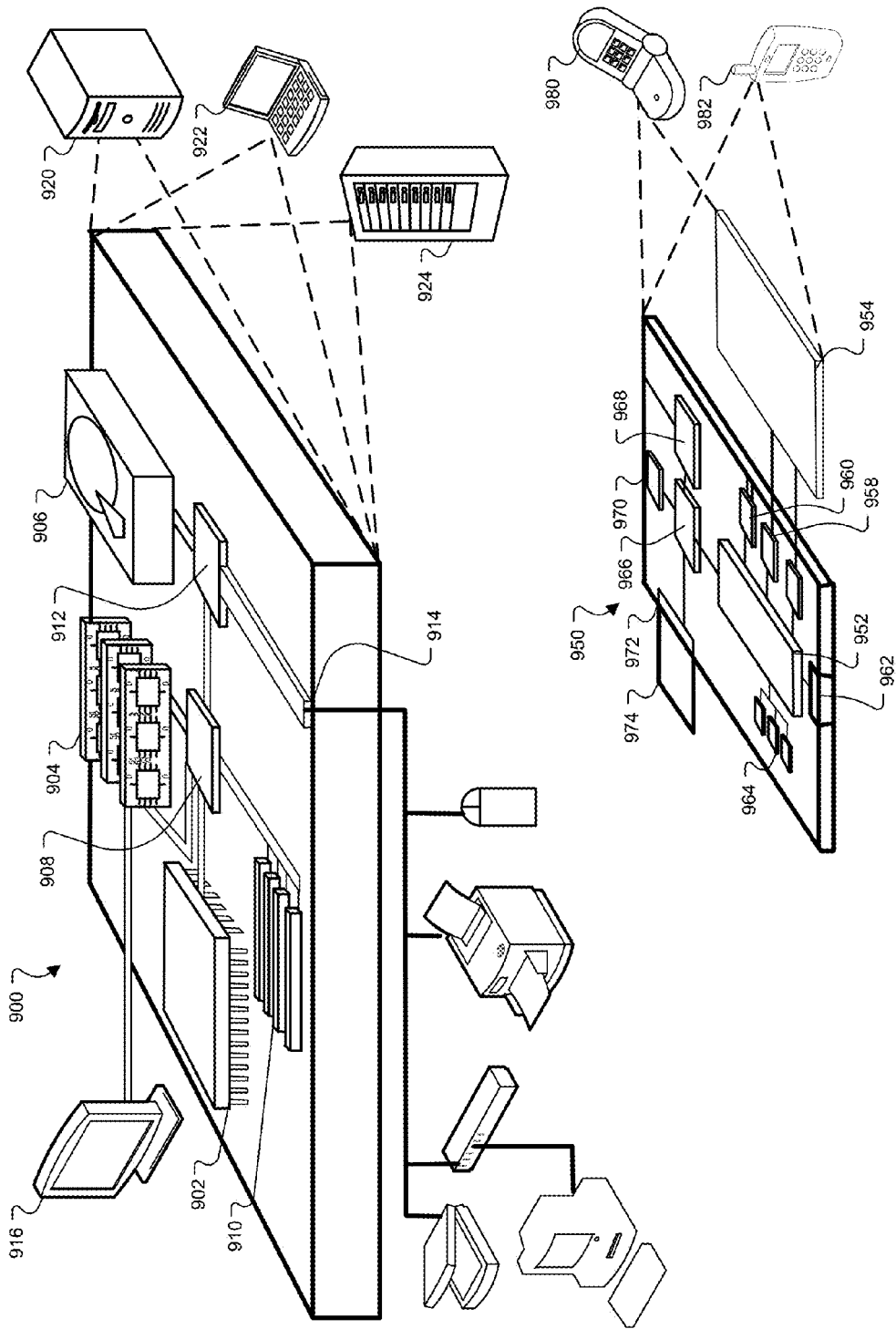
FIG. 9 shows examples of computing devices on which the processes described herein, or portions thereof, may be implemented.

FIG. 9 shows examples of computing devices on which the processes described herein, or portions thereof, may be implemented. In this regard, FIG. 9 shows an example of a generic computing device 900 and a generic mobile computing device 950, which may be used to implement the processes described herein or portions thereof. For example, server 202 and associated index(es) may be implemented on computing device 900. Mobile computing device 950 may represent a client device 204 of FIGS. 2 and 3. Other client devices of FIGS. 2 and 3 may also have the architecture of computing device 900.

Computing device 900 is intended to represent various forms of digital computers, examples of which include laptops, desktops, workstations, personal digital assistants, servers, blade servers, mainframes, and other appropriate computers. Computing device 950 is intended to represent various forms of mobile devices, examples of which include personal digital assistants, cellular telephones, smartphones, and other similar computing devices. The components shown here, their connections and relationships, and their functions, are meant to be exemplary only, and are not meant to limit implementations of the technology described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, for example, display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, examples of which include a magnetic or optical disk.

The storage device 906 is capable of providing mass storage for the computing device 900. In one implementation, the storage device 906 may be or contain a computer-readable medium, examples of which include a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, including those described above. The information carrier may be a non-transitory computer- or machine-readable medium, for example, the memory 904, the storage device 906, or memory on processor 902. For example, the information carrier may be a non-transitory, machine-readable storage medium.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, e.g., a keyboard, a pointing device, a scanner, or a networking device, e.g., a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer, e.g., a laptop computer 922. Alternatively, components from computing device 900 may be combined with other components in a mobile device (not shown), e.g., device 950. Each of such devices may contain one or more of computing device 900, 950, and an entire system may be made up of multiple computing devices 900, 950 communicating with each other.

Computing device 950 includes a processor 952, memory 964, an input/output device, e.g. a display 954, a communication interface 966, and a transceiver 968, among other components. The device 950 may also be provided with a storage device, e.g., a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, e.g., control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may include appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided by the SIMM cards, along with additional information, e.g., placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, including those described above. The information carrier is a computer- or machine-readable medium, e.g., the memory 964, expansion memory 974, or memory on processor 952 that may be received, e.g., over transceiver 968 or external interface 962.

Device 950 may communicate wirelessly through communication interface 966, which may include digital signal processing circuitry where necessary. Communication interface 966 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, e.g., using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, e.g., through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

For situations in which the systems and techniques discussed herein determine personal information about users, the users may be provided with an opportunity to enable/disable programs or features that may determine personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (e.g., to a city, zip code, or state level), so that a particular location of the user cannot be determined.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

All processes described herein and variations thereof (referred to as "the processes") contain functionality to ensure that party privacy is protected. To this end, the processes may be programmed to confirm that a user's membership in a social networking account is publicly known divulging, to another party, that the user is a member. Likewise, the processes may be programmed to confirm that information about a party is publicly known before divulging that information to another party, or even before incorporating that information into a social graph.

In the context of this disclosure, the terms social network and social networking service may be used interchangeably.

Other implementations not specifically described herein are also within the scope of the following claims.

What is claimed is:

1. A method performed by one or more processing devices comprising:
    identifying a first group that includes a specified number of entities;
    associating a first group restrict with the first group, wherein the first group restrict comprises data that identifies each of the specified number of entities;
    assigning the first group restrict to one or more items of content in a search index, the first group restrict identifying the specified number of entities that are permitted access to the one or more items of content;
    determining that the specified number of entities included by the first group is less than a threshold number; and
    in response to the determining, expanding the first group, including:
        identifying a searcher restrict for each entity of the specified number of entities included by the first group,
        replacing the first group restrict by assigning each identified searcher restrict with the one or more items of content, each identified searcher restrict identifying a corresponding entity that is permitted access to the one or more items of content.

2. The method of claim 1, wherein replacing the first group restrict includes the first group restrict being removed from the search index.

3. The method of claim 1, further comprising:
    updating a restrict table to reflect the assignment of each identified searcher restrict with the one or more items of content, the restrict table being accessible to determine which restricts to include in a search query.

4. The method of claim 1, further comprising selecting the threshold number to achieve a balance between search query complexity and search index complexity.

5. The method of claim 1, further comprising:
    obtaining a search query, the search query comprising a group restrict and a searcher restrict;
    matching the group restrict to a corresponding group restrict associated with content in the search index, and matching the searcher restrict to a corresponding searcher restrict associated with content in the search index; and
    retrieving, from the search index, content in the search index that is associated with the corresponding group restrict, and content in the search index that is associated with the searcher restrict.

6. The method of claim 1, wherein the one or more items of content comprises public content, the public content comprising information available from at least one unrestricted resource.

7. The method of claim 1, wherein the one or more items of content comprises private content, the private content comprising information available from at least one restricted resource.

8. The method of claim 1, further comprising:
 determining the first group based on social connections among nodes of a social graph.

9. One or more non-transitory machine-readable media comprising instructions that are executable to perform operations comprising:
 storing one or more items of content in a search index in computer memory;
 storing, for each item of content of the one or more items of content, an access control list (ACL) in association with the item of content, the ACL corresponding to a first group restrict that identifies a specified number of entities included by a first group that are permitted access to the item of content;
 determining that the specified number of entities included by the first group is less than a threshold number;
 in response to the determining, expanding the first group, including:
  identifying a searcher restrict for each entity of the specified number of entities included by the first group, and
  modifying, for each item of content of the one or more items of content, the ACL for the item of content in the search index by replacing the first group restrict for the item of content and assigning each identified searcher restrict with the item of content, each identified searcher restrict identifying a corresponding entity that is permitted access to the item of content.

10. The one or more non-transitory machine-readable media of claim 9, wherein the operations comprise:
 updating the search index so that the search index reflects modification of the ACL for each item of content of the one or more items of content, the search index being updated within a specified period of time following modification.

11. The one or more non-transitory machine-readable media of claim 9, wherein the index is updated in response to the modification of the ACL for each item of content of the one or more items of content.

12. The one or more non-transitory machine-readable media of claim 9, wherein the operations comprise:
 updating a restrict table to reflect modification of the ACL for each item of content of the one or more items of content, the restrict table being accessible to determine which restricts to include in a search query.

13. A system comprising:
 a computing device to generate a search index; and
 a computer-readable medium coupled to the computing device and having instructions stored thereon which, when executed by the computing device, cause the computing device to perform operations comprising:
  identifying a first group that includes a specified number of entities;
  associating a first group restrict with the first group, wherein the first group restrict comprises data that identifies each of the specified number of entities;
  assigning the first group restrict to one or more items of content in the search index, the first group restrict identifying the specified number of entities that are permitted access to the one or more items of content;
  determining that the specified number of entities included by the first group is less than a threshold number; and
  in response to the determining, expanding the first group, including:
   identifying a searcher restrict for each entity of the specified number of entities included by the first group,
   replacing the first group restrict by assigning each identified searcher restrict with the one or more items of content, each identified searcher restrict identifying a corresponding entity that is permitted access to the one or more items of content.

14. The system of claim 13, the operations further comprising:
 obtaining a search query, the search query comprising a group restrict and a searcher restrict;
 matching the group restrict to a corresponding group restrict associated with content in the search index, and matching the searcher restrict to a corresponding searcher restrict associated with content in the search index; and
 retrieving, from the search index, content in the search index that is associated with the corresponding group restrict, and content in the search index that is associated with the searcher restrict.

15. The system of claim 13, wherein the one or more items of content comprises public content, the public content comprising information available from at least one unrestricted resource.

16. The system of claim 13, wherein the one or more items of content comprises private content, the private content comprising information available from at least one restricted resource.

17. The system of claim 13, wherein the operations further comprise:
 determining the first group based on social connections among nodes of a social graph.

* * * * *